United States Patent
McCracken et al.

(10) Patent No.: US 10,373,724 B1
(45) Date of Patent: Aug. 6, 2019

(54) POWER CABLES, COMPUTING DEVICES USING THE SAME, AND METHODS OF USE

(71) Applicant: Microsoft Technology Licensing, LLC, Redmond, WA (US)

(72) Inventors: Ivan Andrew McCracken, Bellevue, WA (US); Joel James Schmelzle, Bothell, WA (US); Miki Kashiwa, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/870,384

(22) Filed: Jan. 12, 2018

(51) Int. Cl.
| | |
|---|---|
| *H01B 7/04* | (2006.01) |
| *H01B 1/02* | (2006.01) |
| *H01B 7/18* | (2006.01) |
| *H01B 7/02* | (2006.01) |

(52) U.S. Cl.
CPC .......... *H01B 1/026* (2013.01); *H01B 7/0208* (2013.01); *H01B 7/04* (2013.01); *H01B 7/1875* (2013.01); *C08L 2203/202* (2013.01)

(58) Field of Classification Search
CPC ........ H01B 1/026; H01B 7/0208; H01B 7/04; C08L 2203/202
USPC ...................................................... 174/113 C
See application file for complete search history.

(56) References Cited

U.S. PATENT DOCUMENTS

| | | |
|---|---|---|
| 6,417,445 B1 | 7/2002 | Sato et al. |
| 7,034,228 B2 | 4/2006 | Yokoi et al. |
| 8,818,153 B2 | 8/2014 | Hayashishita et al. |
| 9,165,695 B2 | 10/2015 | Muramatsu et al. |
| 2010/0018745 A1 | 1/2010 | Tsukamoto et al. |
| 2010/0065327 A1 | 3/2010 | Lin et al. |
| 2015/0083458 A1 | 3/2015 | Tanaka et al. |
| 2015/0366508 A1 | 12/2015 | Chou et al. |
| 2016/0042832 A1 | 2/2016 | Rybski et al. |
| 2016/0314873 A1 | 10/2016 | Hayashishita et al. |
| 2017/0169915 A1 | 6/2017 | Rybski et al. |

FOREIGN PATENT DOCUMENTS

| | | |
|---|---|---|
| FR | 2816093 A1 | 5/2002 |
| WO | 2012134087 A2 | 10/2012 |

OTHER PUBLICATIONS

"Axon Cable & interconnect", Retrieved From <<https://web.archive.org/web/20131102083331/https://www.axon-cable.com/publications/Coaxial-cables.pdf>>, Nov. 2, 2013, 8 Pages.
"International Search Report and Written Opinion Issued in PCT Application No. PCT/US2018/067769", dated Mar. 25, 2019, 13 Pages.

*Primary Examiner* — Tremesha S Willis
(74) *Attorney, Agent, or Firm* — Ray Quinney & Nebeker P.C.; Paul N. Taylor (57) ABSTRACT

A power cable may include a first plurality of copper alloy wires having a first percentage of strengthening alloying material and a second plurality of copper alloy wires having a second percentage of strengthening alloying material. One or more of the second plurality of copper alloy wires may abut one or more of the first plurality of copper alloy wires. The second percentage of strengthening alloying material may be different than the first percentage of strengthening alloying material. Computing devices using power cables are also described.

20 Claims, 5 Drawing Sheets

POWER CABLES, COMPUTING DEVICES USING THE SAME, AND METHODS OF USE

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computer. Hybrid computers may act as a tablet computer or a laptop computer. Many hybrid computers include input devices that may be separated from the screen.

The subject matter claimed herein is not limited to implementations that solve any disadvantages or that operate only in environments such as those described above. Rather, this background is only provided to illustrate one exemplary technology area where some implementations described herein may be practiced.

BRIEF SUMMARY

In one implementation, a power cable is described. The power cable includes a first plurality of copper alloy wires having a first percentage of strengthening alloying material and a second plurality of copper alloy wires having a second percentage of strengthening alloying material. One or more of the second plurality of copper alloy wires may abut one or more of the first plurality of copper alloy wires. The second percentage of strengthening alloying material is different than the first percentage of strengthening alloying material. The power cable may include a third plurality of copper alloy wires having a third percentage of strengthening alloying material In another implementation, a computing device is described. The computing device includes a first portion having a first computing component and a second portion having a second computing component. The computing device includes a hinge connecting the first portion to the second portion. Any power cable as described herein puts the first computing component and the second computing component in electrical connection. The power cable may extend through the hinge.

In a further implementation, a computing device is described. The computing device includes a processor in a first portion, a power storage device in a second portion, and a hinge connecting the first portion to the second portion. The computing device may include a power cable that puts the processor and the power storage device in electrical connection. The power cable extends through the hinge. The power cable includes a first plurality of copper alloy wires having a first percentage of silver and a second plurality of copper alloy wires surrounding the first plurality of copper alloy wires and having a second percentage of silver. The second percentage of silver is different than the first percentage of silver. The first plurality of copper alloy wires and the second plurality of copper alloy wires consist of nineteen wires. The conductivity of the first plurality of copper alloy wires and the second plurality of copper alloy wires is greater than three thousand ohms per kilometer. The power cable includes an insulation layer encapsulating the first plurality of copper alloy wires and the second plurality of copper alloy wires. The power cable includes a third plurality of copper alloy wires having a third percentage of silver. The third plurality of copper alloy wires surround the insulation layer. The first percentage, the second percentage, and the third percentage are less than four percent of silver. The first plurality of copper alloy wires, the second plurality of copper alloy wires, and the third plurality of copper alloy wires have an affected length of less than four millimeters. The first plurality of copper alloy wires, the second plurality of copper alloy wires, and the third plurality of copper alloy wires have a range of motion of greater than one hundred and eighty degrees.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

To describe the way the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to power cables, computing devices using the same, and methods of use. More particularly, this disclosure generally relates to power cables that include multiple wires of varying composition.

As devices continue to get thinner, components continue to get smaller. For example, hinges now have less space for wires and other components that may extend from one portion of a computing device to another. In another example, it may be desirable to have the processor and at least one power storage device located in different portions of the computing device. In other words, the processor may be located in a first portion (e.g., half) and the power storage device may be located in a second portion (e.g., half). In implementations with a processor located in a different portion of the computing device than the power storage device, a power cable used to source the power of the processor, providing a physical electrical connection (e.g., to transfer energy) from the power storage device to the components that convert and distribute that power to the processor. In some implementations, having an electrical connection may include providing a low impedance path in which electrical current can flow by, for example, being in parallel, working electrically together, touching in many points, or otherwise being electrically connected. This cable may be larger than a data cable typically used to provide data from a processor to a display. The processor, in some implementations, may be the main processing unit of the device.

Wires that pass through a hinge may be exposed to stress and resulting strain as well as fatigue. A wire extending through a hinge may have an affected length. The affected length is the portion that extends through the hinge and is affected (e.g., stressed) by movement of the hinge. Typically, the smaller a hinge gets the smaller the affected length becomes. Thus, the smaller the affected length becomes the, typically, larger the stress applied to the affected length. Furthermore, some computing devices include hinges that allow the device to move up to (and including) three hundred and sixty degrees. These hinges may apply further stresses to the affected length of the wire as the compression and/or tension is applied beyond a typical forty-five degrees in each direction. In some implementations, the affected length may be the holding length. The holding length may be the length that is held as the wire is moved (e.g., bent).

In at least one implementation, a power cable includes a non-impedance controlled micro coaxial wire designed to carry power through the center with ground return on the shielding portion. In at least one implementation, a power cable is a custom gauge (e.g., not one of the standard American wire gauge (AWG)) wire. In at least one implementation, a power cable is a custom gauge wire that includes 19 center core wires in a 0.25 mm diameter cable coaxial connector to carry as much power as possible. In at least one implementation, a power cable is a custom gauge wire that maximizes the space available in a 0.25 mm diameter cable coaxial connector to carry as much power as possible. In at least one implementation, a power cable includes a custom winding of center core of the wire with a blend of seven strands of copper alloy with three percent silver and twelve strands of copper alloy with one percent silver.

Figure 1:
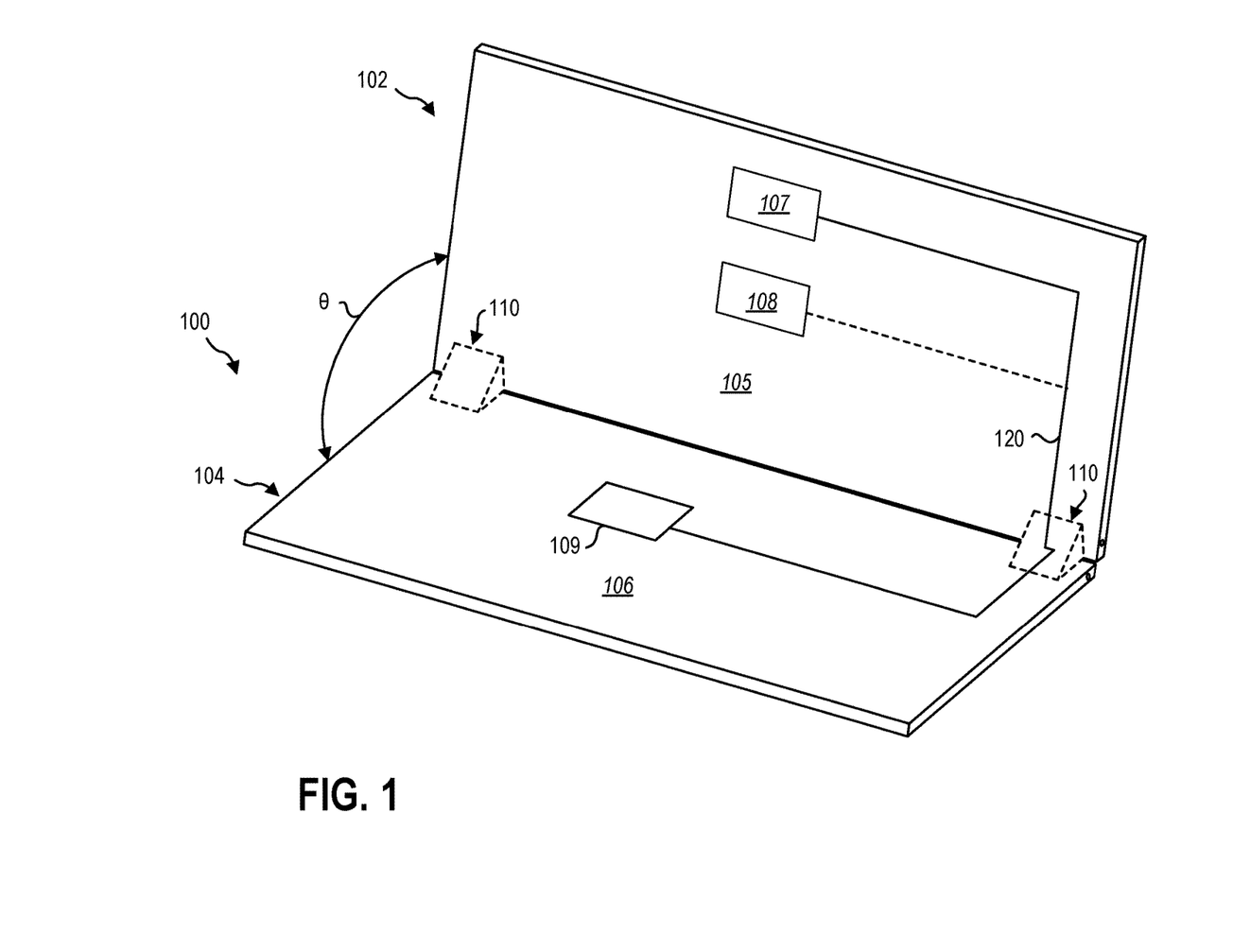
FIG. 1 is an isometric view of an implementation of a computing device in an open configuration.

FIG. 1 is an isometric view of an implementation of a computing device 100 in an open configuration. The computing device 100 may include laptops, hybrid computers, telecommunications devices, such as, smart phones, gaming devices, or other computing devices. In at least one embodiment, the computing device 100 may include any device with an electronic component and a hinge. The computing device 100 may include a first portion 102 and a second portion 104. The first portion 102 is connected to the second portion 104 by a hinge 110. The hinge 110, shown in phantom, may be covered, as illustrated.

The first portion 102 may include a display 105. The display 105 may be a touch sensitive display screen and thus may act as an input. The second portion 104 may include an input device 106. The input device 106 may include a keyboard, touchpad, one or more buttons, other input devices, or combinations thereof that may be used to provide input to a processor 107. For example, the first portion 102 and the second portion 104 may both include displays 105 that are touch sensitive.

The first portion 102 and/or the second portion 104 may include a processor 107, memory 108, a power storage device 109, other computing components, or combinations thereof. For example, as shown, the first portion 102 may include a processor 107 and memory 108, while the second portion 104 may include a power storage device 109. The power storage device 109 may be used to provide power to the processor 107 and/or one or more computing components.

A power cable 120 may put circuits for powering one or more computing components (e.g., display 105, input device 106, processor 107, and memory 108) in electrical connection with the power storage device 109. As shown, the power cable 120 may extend through the hinge 110. In other words, the hinge 110 may include a passage or channel through which the power cable 120 may pass.

Figure 2:
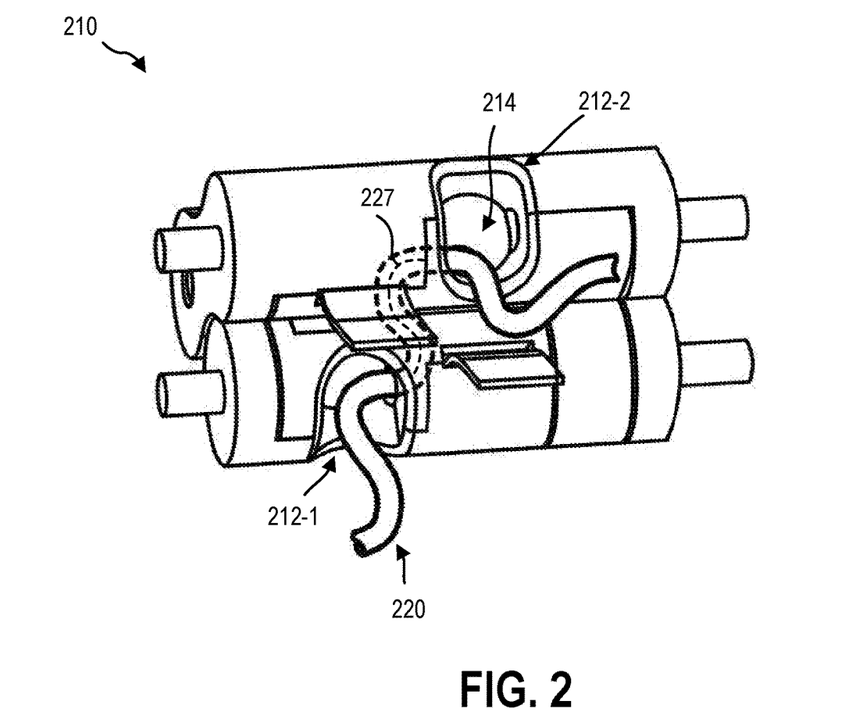
FIG. 2 is an isometric front view of an implementation of a hinge.

Referring briefly to FIG. 2, the isometric front view of an implementation of a hinge 210 is shown. In some implementations, a power cable (e.g., power cable 220) may extend through a first opening 212-1 and through of a second opening 212-2. A channel 214 may extend between the first opening 212-1 and the second opening 212-2. The power cable 220 may have an affected length 227. The affected length 227 is shown as a length of the power cable 220 that is within the channel 214. In other implementations, the affected length 227 may be a length of the power cable 220 that contacts the channel 214. In other words, the portion of the power cable 220 that touches the channel 214 may be the affected length 227. In some implementations, the length of the power cable 220 that is deformed during movement of the hinge 210 may be the affected length 227. For example, the portions of the power cable 220 that are shown in the openings 212 may not actually contact the hinge 210 (e.g., within the channel 214) while the portion of the power cable 220 shown in phantom may abut the inside of the channel 214.

In some implementations, the affected length 227 may be in a range having an upper value, a lower value, or upper and lower values including any of 25 mm, 10 mm, 5 mm, 4 mm, 3.5 mm, 3 mm, 2.5 mm, 2 mm, 1.5 mm, 1 mm, 0.5 mm, or any value therebetween. For example, the affected length 227 may be 3 mm. In other examples, the affected length may be less than 4 mm. In further examples, the affected length 227 may be greater than 0.5 mm. In yet other examples, the affected length 227 may be in a range of 0.5 mm to 25 mm. In yet further examples, the affected length 227 may be in a range of 0.5 mm to 10 mm.

Referring back to FIG. 1, as described above, when the processor 107 and the power storage device 109 are on separate portions (e.g., first portion 102 and second portion 104), the power requirements for the power cable 120 are generally increased. In other words, the conductivity of the power cable 120 may have a predetermined amount.

In some implementations, the conductivity may be in a range having an upper value, a lower value, or upper and lower values including any of 4,300 ohms per kilometer (ohms/km), 4,200 ohms/km, 3,500 ohms/km, 3,300 ohms/km, 3,100 ohms/km, or any value therebetween. For example, the conductivity may be 3,300 ohms/km. In other examples, the conductivity may be less than 4,300 ohms/km.

In further examples, the conductivity may be greater than 3,100 ohms/km. In yet other examples, the conductivity may be in a range of 3,100 homs/km to 4,300 ohms/km. In yet further examples, the conductivity may be in a range of 3,100 ohms/km to 3,500 ohms/km.

The second portion 104 may also include a processor (e.g., processor 107, not shown) and/or the first portion 102 may also include a power storage device (e.g., power storage device 109). In some implementations, only one of the first portion 102 or the second portion 104 may include a processor 107 and/or a power storage device 109. In other implementations, both of the first portion 102 and the second portion 104 include a processor 107 and/or a power storage device 109. In further implementations, one or more computing components (e.g., processors 107, memory 108, and power storage device 109) may be included in the first portion 102 and/or the second portion 104 in any combination.

The present disclosure may be used with computing devices where two portions are rotatably connected together (e.g., hinged). In some implementations, the first portion 102 and the second portion 104 of the computing device may be separable. For example, the first portion 102 may be a mobile phone and the second portion 104 may be a cover, a keyboard, or another device that may be separated from the mobile phone. In other implementations, the first portion 102 and the second portion 104 of the computing device may be fixed together by the hinge 110.

As shown in FIG. 1, the computing device 100 may include a pair of hinges 110. In other implementations, the computing device 100 may include more or fewer hinges 110. For example, the computing device 100 may include a single centrally located hinge 110.

Figure 3:
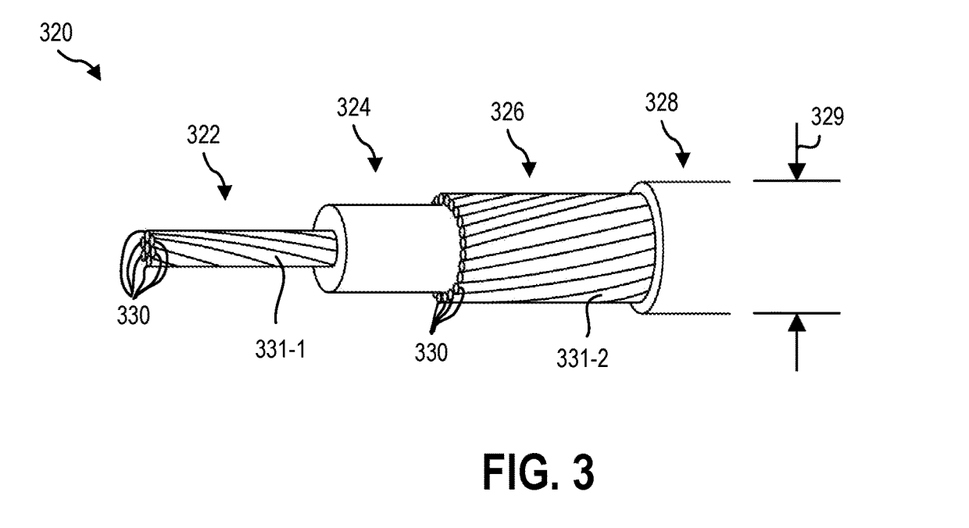
FIG. 3 is a perspective side view of an implementation of a power cable.

FIG. 3 is a perspective side view of an implementation of a power cable 320. The power cable 320 may include a plurality of wires 330. One or more of the wires 330 may not be insulated. In other words, one or more wires 330 may directly abut and may be in electrical connection.

One or more of the wires 330 may be copper alloy. The wires 330 may be coated. For example, the wires 330 may be coated with silver, tin, other coatings, or combinations thereof. In some implementations, one or more wires 330 may include a percentage of strengthening alloying material. Examples of strengthening alloying material may include silver, tin, other strengthening alloying materials, or combinations thereof.

One or more of the wires 330 may have a percentage of strengthening alloying material. In some implementations, the strengthening alloying material may be in a range having an upper value, a lower value, or upper and lower values including any of 5%, 4%, 3.5%, 3%, 2.5%, 2%, 1.5%, 1%, 0.5%, 0.25%, 0.1% or any value therebetween. For example, the strengthening alloying material may be 3%. In other examples, the strengthening alloying material may be less than 4%. In further examples, the strengthening alloying material may be greater than 0.5%. In yet other examples, the strengthening alloying material may be in a range of 0.1% to 5%. In yet further examples, the strengthening alloying material may be in a range of 0.5% to 4%.

In some implementations, the strengthening alloying material is silver and may be in a range having an upper value, a lower value, or upper and lower values including any of 5%, 4%, 3.5%, 3%, 2.5%, 2%, 1.5%, 1%, 0.5%, 0.25%, 0.1% or any value therebetween. For example, the silver strengthening alloying material may be 3%. In other examples, the silver strengthening alloying material may be less than 4%. In further examples, the silver strengthening alloying material may be greater than 0.5%. In yet other examples, the silver strengthening alloying material may be in a range of 1% to 3%. Where silver is used as the strengthening alloying material, the higher percentage of silver, the higher the strength of the alloy, but generally the lower the conductivity and/or ductility.

In some implementations, the strengthening alloying material is tin and may be in a range having an upper value, a lower value, or upper and lower values including any of 1%, 0.9%, 0.8%, 0.7%, 0.6%, 0.5%, 0.4%, 0.2%, 0.1%, or any value therebetween. For example, the tin strengthening alloying material may be less than 1%. In other examples, the tin strengthening alloying material may be greater than 0.1%. In further examples, the gold strengthening alloying material may be between 0.1% and 1%. In yet other examples, the tin strengthening alloying material may be in a range of 0.1% to 0.8%. Where tin is used as the strengthening alloying material, the higher percentage of tin, the higher the strength of the alloy, but generally the lower the conductivity and/or ductility.

The power cable 320 may include an inner core 322. The inner core 322 may be made up of a portion of the plurality of wires 330. As shown, the inner core 322 includes nineteen wires 330. In other implementations, more or fewer wires 330 may be included in the inner core 322. As shown, the inner core 322 may be the center of the power cable 320. In other implementations, the inner core 322 may be offset from, but include, the center of the power cable 320.

As shown, the power cable 320 may include insulation 324 between the inner core 322 and a shield layer 326. In other implementations, the power cable 320 may exclude the insulation 324 and/or shield layer 326.

The shield layer 326 may be made up of a portion of the plurality of wires 330. The shield layer 326 may function as a shield and/or a ground return path. The shield layer 326 is shown with a single layer of wires 330. In other words, the wires 330 of the shield layer 326 may not have another wire 330 that axially (e.g., from the center to the circumference) overlaps between the insulation 324 and the jacket 328. In another example, no wire 330 is located radially outward from any other wire 330 in the shield layer 326.

The shield layer 326 may be surrounded by a jacket 328. In other implementations, the insulation 324 and shield layer 326 may be omitted and the jacket 328 may abut the inner core 322. The insulation 324 and/or jacket 328 may include fluoropolymer materials. For example, the insulation 324 and/or jacket 328 may be made of perfluoroethers such as perfluoroalkoxy alkanes (PFA), ethylene tetrafluoroethylene (ETFE), polytetrafluoroethylene (PTFE), or other perfluroethers.

The power cable 320 may have a maximum outer diameter 329. The maximum outer diameter may be measured from the outermost layer (e.g., the jacket 328 in FIG. 3) of the power cable 320, as shown.

The one or more of the plurality of wires 330 may be wrapped at a pitch 331. For example, the first portion of wires 330 that make up the inner core 322 may have a first pitch 331-1 and/or the second portion of wires 330 that make up the shield layer 326 may have a second pitch 331-2. As shown, the first pitch 331-1 and the second pitch 331-2 may extend in different directions (e.g., at positive and negative angles). In other implementations, the first pitch 331-1 and the second pitch 331-2 may be the same, but extend in different directions. In further implementations, the first pitch 331-1 and the second pitch 331-2 may vary in size, direction, or combinations thereof.

Figure 4:
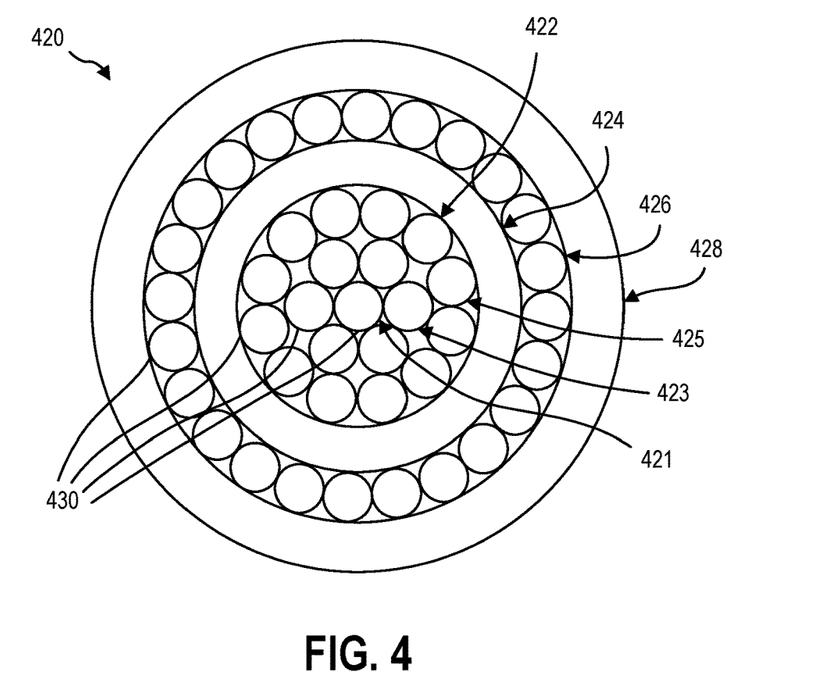
FIG. 4 is a cross-sectional view of an implementation of a power cable.

FIG. 4 is a cross-sectional view of an implementation of a power cable 420. The power cable 420 may be similar to the power cables 120, 220, 320 shown in FIGS. 1-3. One or more features and/or components of the power cables 120, 220, 320 may replace and/or supplement one or more features and/or components of the power cable 420.

The power cable 420 may include a plurality of wires 430. The plurality of wires 430 may be arranged in an inner core 422, an insulation layer 424, a shield layer 426, a jacket 428, or combinations thereof. In some implementations, the power cable 420 may only include the inner core 422 and the jacket. In other implementations, the insulation layer 424 and the shield layer 426 may be included.

The inner core 422 may include a plurality of wires 430 in a first ring 421, a second ring 423, and a third ring 425. The first ring 421 may be the innermost ring. The first ring 421 may include a single wire 430. The second ring 423 may include six wires 430. The third ring 425 may include twelve wires 430.

The second ring 423 may directly abut the first ring 421. The third ring 425 may directly abut the second ring 423. In other words, the wires 430 of the second ring 423 may directly touch the wires 430 of the first ring 421 and/or the wires of the third ring 425 may directly touch the wires 430 of the second ring 423.

The insulation layer 424 may abut the inner core 422. In some implementations, the insulation layer 424 may abut the third ring 425 of the inner core 422. The shield layer 426 may abut the insulation layer 424 and the jacket 428.

The wires 430 may vary in, for instance, material composition. For example, the wire 430 of the first ring 421 of the inner core 422 may have a different composition than one or more other wires used in the power cable 420. The wires 430 may vary in material composition in various patterns.

Figure 5:
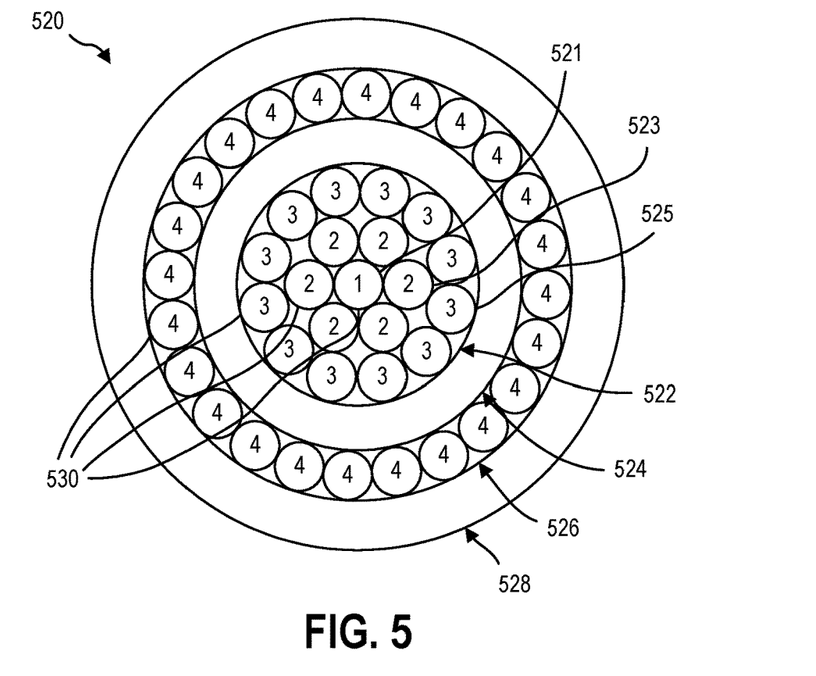
FIG. 5 is a cross-sectional view of a second implementation of a power cable with radially varying wires.

FIG. 5 is a cross-sectional view of a second implementation of a power cable 520 with radially varying wires 530. For ease of description, each wire is labeled generally with the number 530 and specifically with an additional number. For example, the innermost wire may be considered labeled as 530-1 while the outermost wires (e.g., the shield layer 526) may be considered labeled 530-4.

The power cable 520 may be similar to the power cables 120, 220, 320, 420 shown in FIGS. 1-4. One or more features and/or components of the power cables 120, 220, 320, 420 may replace and/or supplement one or more features and/or components of the power cable 520.

The plurality of wires 530 may be arranged in an inner core 522, an insulation layer 524, a shield layer 526, a jacket 528, or combinations thereof. The inner core 522 may include a plurality of wires 530 in a first ring 521, a second ring 523, and a third ring 525.

As shown, the wires 530 vary radially. In other words, the wires 530 may differ at different radial locations. For example, the first ring 521 may include a wire 530-1 with a first material, the second ring 523 may include a second plurality (e.g., six) of wires 530-2 with a second material, the third ring 525 may include a third plurality (e.g., twelve) of wires 530-3 with a third material, and the shield layer 526 may include a fourth plurality (e.g., twenty-four) of wires 530-4 with a fourth material. The first material may include a first percentage of a strengthening alloying material, the second material may include a second percentage of a strengthening alloying material, the third material may include a third percentage of a strengthening alloying material, and the fourth material may include a fourth percentage of a strengthening alloying material.

The percentages of strengthening alloying material may increase or decrease radially. For example, the first percentage of strengthening alloying material may be less than the second percentage of strengthening alloying material, the second percentage of strengthening alloying material may be less than the third percentage of strengthening alloying material, and the third percentage of strengthening alloying material may be less than the fourth percentage of strengthening alloying material. In another example, the first percentage of strengthening alloying material may be more than the second percentage of strengthening alloying material, the second percentage of strengthening alloying material may be more than the third percentage of strengthening alloying material, and the third percentage of strengthening alloying material may be more than the fourth percentage of strengthening alloying material.

As shown in FIG. 5, each wire 530 in each ring (e.g., rings 521, 523, 525 and/or shielding layer 526) may be the same (e.g., the same material. In other implementations, one or more wires 530 in each ring may vary (e.g., in material composition) with one or more wires 530 in the same ring.

Figure 6:
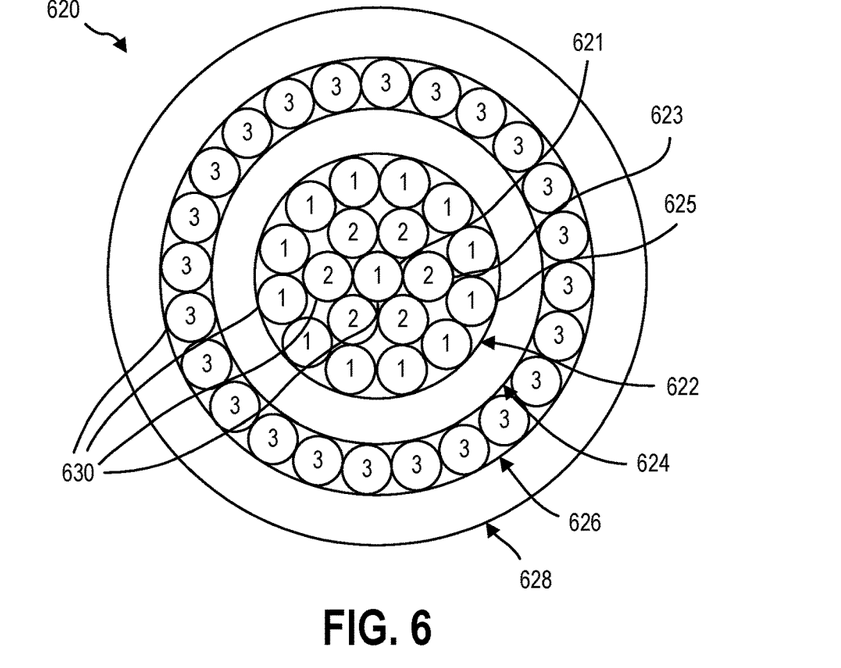
FIG. 6 is a cross-sectional view of a third implementation of a power cable with varying wires.

FIG. 6 is a cross-sectional view of a third implementation of a power cable 620 with varying wires 630. For ease of description, each wire is labeled generally with the number 630 and specifically with an additional number.

The power cable 620 may be similar to the power cables 120, 220, 320, 420, 520 shown in FIGS. 1-5. One or more features and/or components of the power cables 120, 220, 320, 420, 520 may replace and/or supplement one or more features and/or components of the power cable 620.

The plurality of wires 630 may be arranged in an inner core 622, an insulation layer 624, a shield layer 626, a jacket 628, or combinations thereof. The inner core 622 may include a plurality of wires 630 in a first ring 621, a second ring 623, and a third ring 625.

As shown, one or more of the wires 630 vary radially in, for instance, material composition. For example, the first ring 621 and the third ring 625 may include a first plurality of wires 630-1 with a first material, the second ring 623 may include a second plurality (e.g., six) of wires 630-2 with a second material, and the shield layer 626 may include a third plurality (e.g., twenty-four) of wires 630-3 with a third material. Thus, the wires 630 of the first ring 621 and the third ring 625 may be the same, but may differ from the wires 630 of the second ring 623 and the shield layer 626. The first material may include a first percentage of a strengthening alloying material, the second material may include a second percentage of a strengthening alloying material, and the third material may include a third percentage of a strengthening alloying material.

As shown in FIG. 6, each wire 630 in each ring (e.g., rings 621, 623, 625 and/or shielding layer 626) may be the same. In other implementations, one or more wires 630 in each ring may vary (e.g., in material composition) with one or more wires 630 in the same ring.

Figure 7:
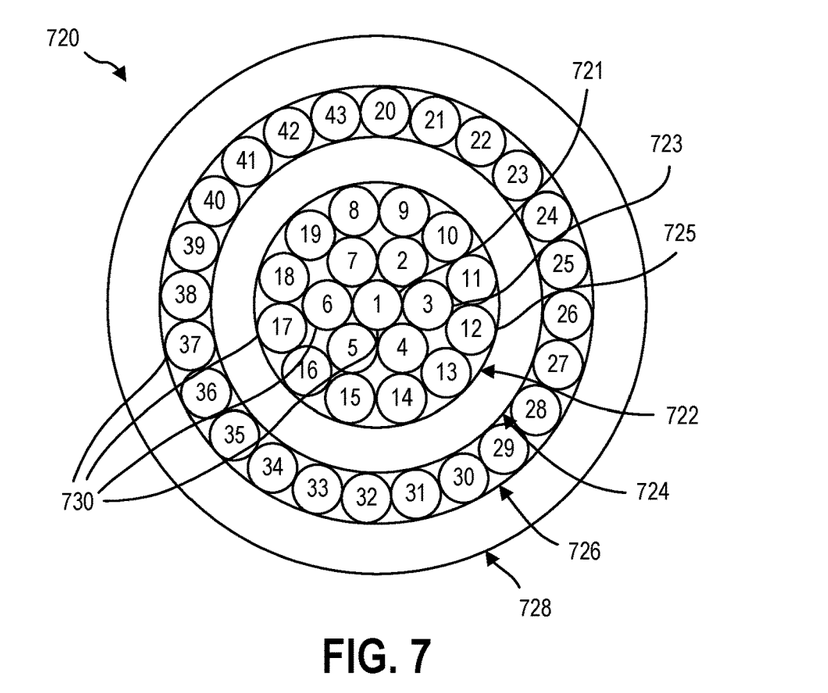
FIG. 7 is a cross-sectional view of a fourth implementation of a power cable with varying wires.

FIG. 7 is a cross-sectional view of a fourth implementation of a power cable 720 with varying wires 730. For ease of description, each wire is labeled generally with the number 730 and specifically with an additional number.

The power cable 720 may be similar to the power cables 120, 220, 320, 420, 520, 620 shown in FIGS. 1-6. One or more features and/or components of the power cables 120, 220, 320, 420, 520, 620 may replace and/or supplement one or more features and/or components of the power cable 720.

The plurality of wires 730 may be arranged in an inner core 722, an insulation layer 724, a shield layer 726, a jacket 728, or combinations thereof. The inner core 722 may include a plurality of wires 730 in a first ring 721, a second ring 723, and a third ring 725.

As shown, one or more of the wires 730 vary radially and circumferentially. For example, the first ring 721 may include a first wire 730-1; the second ring 723 may include a second wire 730-2, a third wire 730-3, a fourth wire 730-4, a fifth wire 730-5, a sixth wire 730-6, and a seventh wire 730-7; the third ring 725 may include an eighth wire 730-8, a ninth wire 730-9, a tenth wire 730-10, an eleventh wire 730-11, a twelfth wire 730-12, a thirteenth wire 730-13, a fourteenth wire 730-14, a fifteenth wire 730-15, a sixteenth wire 730-16, a seventeenth wire 730-17, an eighteenth wire 730-18, and a nineteenth wire 730-19; the shield layer 726 may include a twentieth wire 730-20 through forty-third wire 730-43. Each wire 730 may differ from each other wire 730.

Thus, the wires 730 of the power cable 720 may differ radially (e.g., the first wire 730-1 of the first ring 721, the second wire 730-2 of the second ring 723, the eighth wire 730-8 of the third ring 725, and the twentieth wire 730-20 of the shield layer 726 may all differ from each other) and circumferentially (e.g., the eighth wire 730-8 through the nineteenth wire 730-19 may all differ from each other).

The material of each wire 730 may include a different percentage of a strengthening alloying material. For example, the first wire 730-1 may have a first percentage, the second wire 730-2 may have a second percentage, the eighth wire 730-8 may have an eighth percentage, the twentieth wire 730-20 may have a twentieth percentage, and the forty-third wire 730-43 may have a forty-third percentage, and each percentage (e.g., first through forty-third) may differ. For example, the percentage may increase (e.g., from the first wire 730-1 to the forty-third wire 730-43) and/or decrease (e.g., from the forty-third wire 730-43 to the first wire 730-1) from wire to wire.

Figure 8:
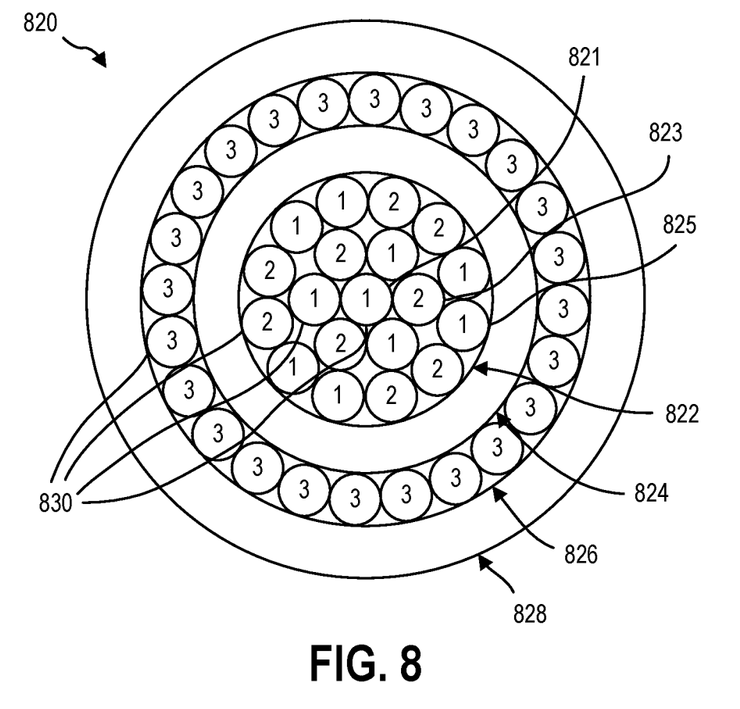
FIG. 8 is a cross-sectional view of a fifth implementation of a power cable with varying wires.

FIG. 8 is a cross-sectional view of a fifth implementation of a power cable 820 with varying wires 830. For ease of description, each wire is labeled generally with the number 830 and specifically with an additional number.

The power cable 820 may be similar to the power cables 120, 220, 320, 420, 520, 620, 720 shown in FIGS. 1-7. One or more features and/or components of the power cables 120, 220, 320, 420, 520, 620, 720 may replace and/or supplement one or more features and/or components of the power cable 820.

The plurality of wires 830 may be arranged in an inner core 822, an insulation layer 824, a shield layer 826, a jacket 828, or combinations thereof. The inner core 822 may include a plurality of wires 830 in a first ring 821, a second ring 823, and a third ring 825.

As shown, one or more of the wires 830 vary radially and circumferentially. For example, the first ring 821 may include a first wire 830-1; the second ring 823 may include a plurality (e.g., three) of first wires 830-1 and a plurality (e.g., three) of second wires 830-2; the third ring 825 may include a plurality (e.g., six) of first wires 830-1 and a plurality (e.g., six) of second wires 830-2; and the shield layer 826 may include a plurality (e.g., twenty-four) of third wires 830-3.

Thus, the wires 830 of the power cable 820 may differ radially and circumferentially while adjacent wires may be the same. For example, pairs of wires (e.g., pairs of first wires 830-1) in the third ring 825 may be the same while differing from other wires (e.g., pairs of second wires 830-2). Adjacent wires 830 may differ radially. For example, the first wire 830-1 in the first ring 821 may differ from the second wires 830-2 in the second ring 823 which may differ from the first wires 8301 of the third ring 825. In other words, the first plurality of wires (e.g., wires 830-1) may be interspersed with the second plurality of wires (e.g., wires 830-2).

The material of various pluralities of wires 830 may include different percentages of a strengthening alloying material. For example, the first wires 830-1 in the first ring 821, the second ring 823, and the third ring 825 may be a first plurality of wires 830 with a first percentage of strengthening alloying material, the second wires 830-2 in the second ring 823 and the third ring 825 may be a second plurality of wires 830 with a second percentage of strengthening alloying material, and the third wires 830-3 in the shield layer 826 may be a third plurality of wires 830 with a third percentage of strengthening alloying material.

Although the implementations described above provide many permutations, all permutations are contemplated, though specific categories of permutations have been described. In some implementations, at least one wire of the wires of a power cable may be different from at least one other wire of the wires of the power cable. In implementations where the wires (e.g., wires 830) of each individual ring (e.g., rings 821, 823, 825 and/or shielding layer 826) are the same (e.g., the wires 830 of the third ring 825 are the same), there are limited numbers of permutations available.

Some implementations with three rings where each wire in each ring is the same must include a first plurality of wires and may only include a third plurality of wires if a second plurality of wires is also included. Thus, in these implementations, there may be twelve permutations, provided below:

| Permutation | First Ring | Second Ring | Third Ring |
|---|---|---|---|
| 1 | 1 | 1 | 2 |
| 2 | 1 | 2 | 1 |
| 3 | 1 | 2 | 2 |
| 4 | 1 | 2 | 3 |
| 5 | 1 | 3 | 2 |
| 6 | 2 | 1 | 1 |
| 7 | 2 | 1 | 2 |
| 8 | 2 | 1 | 3 |
| 9 | 2 | 2 | 1 |
| 10 | 2 | 3 | 1 |
| 11 | 3 | 1 | 2 |
| 12 | 3 | 2 | 1 |

Permutation 4 is shown in the inner core 522 of FIG. 5. Permutation 2 is shown in the inner core 622 of FIG. 6.

Some implementations with four rings (e.g., first ring, second ring, third ring, and shield layer) where each wire in each ring is the same must include a first plurality of wires and may only include a fourth plurality of wires if a third plurality of wires and a second plurality of wires are included and may only include a third plurality of wires if a second plurality of wires is also included. Thus, in these implementations, there may be seventy-four permutations, provided below:

| Permutations | First Ring | Second Ring | Third Ring | Shield Layer |
|---|---|---|---|---|
| 1 | 1 | 1 | 1 | 2 |
| 2 | 1 | 1 | 2 | 1 |
| 3 | 1 | 1 | 2 | 2 |
| 4 | 1 | 1 | 2 | 3 |
| 5 | 1 | 1 | 3 | 2 |
| 6 | 1 | 2 | 1 | 1 |

-continued

| Permutations | First Ring | Second Ring | Third Ring | Shield Layer |
|---|---|---|---|---|
| 7 | 1 | 2 | 1 | 2 |
| 8 | 1 | 2 | 1 | 3 |
| 9 | 1 | 2 | 2 | 1 |
| 10 | 1 | 2 | 2 | 2 |
| 11 | 1 | 2 | 2 | 3 |
| 12 | 1 | 2 | 3 | 1 |
| 13 | 1 | 2 | 3 | 2 |
| 14 | 1 | 2 | 3 | 3 |
| 15 | 1 | 2 | 3 | 4 |
| 16 | 1 | 2 | 4 | 3 |
| 17 | 1 | 3 | 1 | 2 |
| 18 | 1 | 3 | 2 | 1 |
| 19 | 1 | 3 | 2 | 2 |
| 20 | 1 | 3 | 2 | 3 |
| 21 | 1 | 3 | 2 | 4 |
| 22 | 1 | 3 | 3 | 2 |
| 23 | 1 | 3 | 4 | 2 |
| 24 | 1 | 4 | 2 | 3 |
| 25 | 1 | 4 | 3 | 2 |
| 26 | 2 | 1 | 1 | 1 |
| 27 | 2 | 1 | 1 | 2 |
| 28 | 2 | 1 | 1 | 3 |
| 29 | 2 | 1 | 2 | 1 |
| 30 | 2 | 1 | 2 | 2 |
| 31 | 2 | 1 | 2 | 3 |
| 32 | 2 | 1 | 3 | 1 |
| 33 | 2 | 1 | 3 | 2 |
| 34 | 2 | 1 | 3 | 3 |
| 35 | 2 | 1 | 3 | 4 |
| 36 | 2 | 1 | 4 | 3 |
| 37 | 2 | 2 | 1 | 1 |
| 38 | 2 | 2 | 1 | 2 |
| 39 | 2 | 2 | 1 | 3 |
| 40 | 2 | 2 | 2 | 1 |
| 41 | 2 | 2 | 3 | 1 |
| 42 | 2 | 3 | 1 | 1 |
| 43 | 2 | 3 | 1 | 2 |
| 44 | 2 | 3 | 1 | 3 |
| 45 | 2 | 3 | 1 | 4 |
| 46 | 2 | 3 | 2 | 1 |
| 47 | 2 | 3 | 3 | 1 |
| 48 | 2 | 3 | 4 | 1 |
| 49 | 2 | 4 | 1 | 3 |
| 50 | 2 | 4 | 3 | 1 |
| 51 | 3 | 1 | 1 | 2 |
| 52 | 3 | 1 | 2 | 1 |
| 53 | 3 | 1 | 2 | 2 |
| 54 | 3 | 1 | 2 | 3 |
| 55 | 3 | 1 | 2 | 4 |
| 56 | 3 | 1 | 3 | 2 |
| 57 | 3 | 1 | 4 | 2 |
| 58 | 3 | 2 | 1 | 1 |
| 59 | 3 | 2 | 1 | 2 |
| 60 | 3 | 2 | 1 | 3 |
| 61 | 3 | 2 | 1 | 4 |
| 62 | 3 | 2 | 2 | 1 |
| 63 | 3 | 2 | 3 | 1 |
| 64 | 3 | 2 | 4 | 1 |
| 65 | 3 | 3 | 1 | 2 |
| 66 | 3 | 3 | 2 | 1 |
| 67 | 3 | 4 | 1 | 2 |
| 68 | 3 | 4 | 2 | 1 |
| 69 | 4 | 1 | 2 | 3 |
| 70 | 4 | 1 | 3 | 2 |
| 71 | 4 | 2 | 1 | 3 |
| 72 | 4 | 2 | 3 | 1 |
| 73 | 4 | 3 | 1 | 2 |
| 74 | 4 | 3 | 2 | 1 |

Permutation 15 is shown in FIG. 5. Permutation 8 is shown in FIG. 6.

The following are examples of implementations that have been experimentally tested. Bending test conditions were from (1) a zero degree bend, to (2) a ninety degree positive bend, to (3) a zero degree bend, to (4) a ninety degree negative bend with a 4.0 mm mandrel and a 25 gram load at 30 cycles per minute.

In a first implementation, a configuration with an inner core with seven strands of 0.016 mm diameter silver-plated copper alloy with 3% silver, a PFA insulation layer, a shield layer with wires of 0.021 mm diameter silver-plated copper alloy with 1% silver, and a PFA jacket yielded more than 90,000 bending life cycles. Thus, in at least one implementation, for a given path, the life of the power cable may be fifty times longer than a standard power cable.

In a second implementation, a configuration with an inner core with seven strands of 0.016 mm diameter silver-plated copper alloy with 3% silver, a PFA insulation layer, a shield layer with wires of 0.021 mm diameter tin-plated copper alloy with 1% silver, and a PFA jacket yielded approximately 140,000 bending life cycles.

In a third implementation, a configuration with an inner core with seven strands of 0.021 mm diameter silver-plated copper alloy with 3% silver and twelve strands of 0.021 mm diameter silver-plated copper alloy with 1% silver, a PFA insulation layer, a shield layer with wires of 0.021 mm diameter silver-plated copper alloy with 1% silver, and a PFA jacket yielded 70,000 bending life cycles.

In a fourth implementation, a configuration with an inner core with nineteen strands of 0.021 mm diameter silver-plated copper alloy with 2% silver, a PFA insulation layer, a shield layer with wires of 0.021 mm diameter silver-plated copper alloy with 1% silver, and a PFA jacket yielded more than 40,000 bending life cycles.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A power cable, comprising:
    a first plurality of copper alloy wires having a first percentage of a strengthening alloying material; and
    a second plurality of copper alloy wires having a second percentage of the strengthening alloying material, one or more of the second plurality of copper alloy wires abutting one or more of the first plurality of copper alloy wires, the second percentage of the strengthening alloying material being different than the first percentage of the strengthening alloying material, wherein conductivity of the first plurality of copper alloy wires and the second plurality of copper alloy wires are greater than three thousand ohms per kilometer.

2. The power cable of claim 1, wherein the strengthening alloying material is silver.

3. The power cable of claim 2, wherein the first percentage and the second percentage of the silver are less than four percent.

4. The power cable of claim 1, wherein the strengthening alloying material is tin.

5. The power cable of claim 4, wherein the first percentage and the second percentage of the tin are less than 0.8 percent.

6. The power cable of claim 1, wherein the first percentage is greater than the second percentage.

7. The power cable of claim 1, wherein the first percentage is less than eight times the second percentage.

8. The power cable of claim 1, wherein the first plurality of copper alloy wires and the second plurality of copper alloy wires consist of seven wires.

9. The power cable of claim 1, wherein the first plurality of copper alloy wires and the second plurality of copper alloy wires consist of nineteen wires.

10. The power cable of claim 1, wherein the second plurality of copper alloy wires abut a majority of the first plurality of copper alloy wires.

11. The power cable of claim 1, wherein the second plurality of copper alloy wires are interspersed with the first plurality of copper alloy wires.

12. The power cable of claim 1, further comprising: a third plurality of copper alloy wires having a third percentage of the strengthening alloying material.

13. The power cable of claim 12, the first plurality of copper alloy wires and the second plurality of copper alloy wires consist of nineteen wires.

14. The power cable of claim 12, further comprising an insulation layer encapsulating the first plurality of copper alloy wires and the second plurality of copper alloy wires.

15. The power cable of claim 14, the third plurality of copper alloy wires surrounding the insulation layer.

16. The power cable of claim 15, the first percentage, the second percentage, and the third percentage being less than four percent of silver.

17. The power cable of claim 15, wherein the first plurality of copper alloy wires, the second plurality of copper alloy wires, and the third plurality of copper alloy wires have an affected length of less than four millimeters.

18. The power cable of claim 15, wherein the first plurality of copper alloy wires, the second plurality of copper alloy wires, and the third plurality of copper alloy wires have a range of motion of greater than one hundred and eighty degrees.

19. The power cable of claim 15, wherein conductivity of the first plurality of copper alloy wires, the second plurality of copper alloy wires, and the third plurality of copper alloy wires are greater than three thousand ohms per kilometer.

20. The power cable of claim 1, further comprising:
    an insulation layer encapsulating the first plurality of copper alloy wires and the second plurality of copper alloy wires; and
    a third plurality of copper alloy wires having a third percentage of silver, the third plurality of copper alloy wires surrounding an exterior surface of the insulation layer, the first percentage of silver, the second percentage of silver, and the third percentage of silver being less than four percent of silver, the first plurality of copper alloy wires, the second plurality of copper alloy wires, and the third plurality of copper alloy wires have an affected length of less than four millimeters, the first plurality of copper alloy wires, the second plurality of copper alloy wires, and the third plurality of copper alloy wires have a range of motion of greater than one hundred and eighty degrees.

* * * * *